Figure 1:
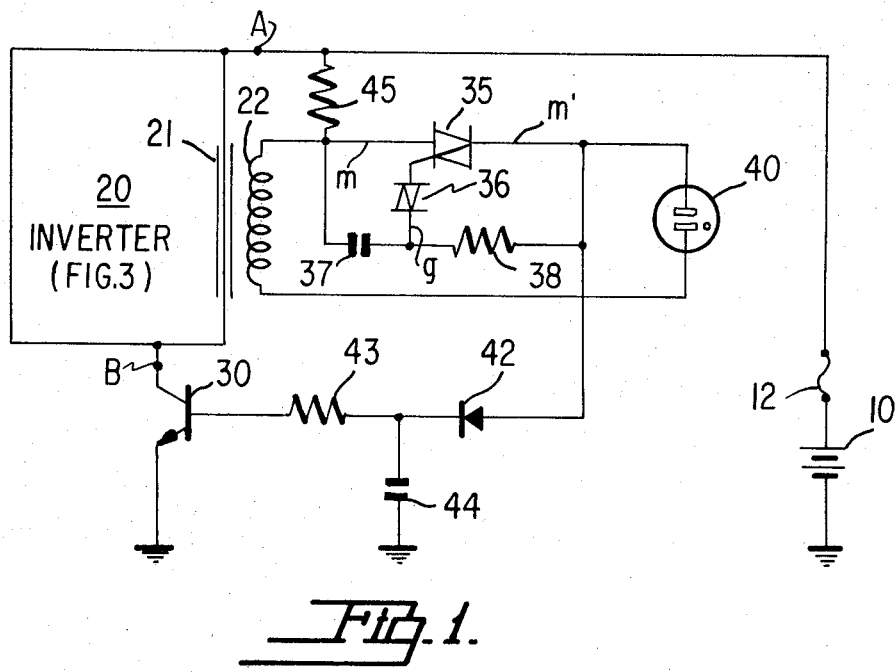

United States Patent [19]
Sondermeyer

[11] 3,721,889
[45] March 20, 1973

[54] LOAD SENSING CIRCUITS
[75] Inventor: Jack Charles Sondermeyer, Somerville, N.J.
[73] Assignee: RCA Corporation, New York, N.Y.
[22] Filed: June 30, 1971
[21] Appl. No.: 158,452

[52] U.S. Cl....................321/8 R, 307/150, 307/157, 315/362, 321/16
[51] Int. Cl.........H02m 7/00, H02j 7/00, H05b 37/02
[58] Field of Search..................321/8, 14, 18, 21–24, 321/16; 307/125, 139, 150, 157; 315/362; 323/22 SC, 24

[56] References Cited

UNITED STATES PATENTS 2,480,396  8/1949  Compton..............................307/150
3,356,891  12/1967  Godard..............................307/157 X
3,377,540  4/1968  Meyer..................................321/14 X
3,447,031  5/1969  Jenks..................................315/262 X

OTHER PUBLICATIONS

RCA Technical Note No. 814, "Variable On–Time Phase Control Circuit," Feb. 5, 1969

Primary Examiner—William H. Beha, Jr.
Attorney—Edward J. Norton

[57] ABSTRACT

In a circuit including an inverter adapted to provide power to a load, means are provided for sensing the absence of the load in the circuit whereupon inverter operation is inhibited.

4 Claims, 3 Drawing Figures

INVENTOR.
JACK C. SONDERMEYER

3,721,889

LOAD SENSING CIRCUITS

This invention relates to load sensing circuits, and, more particularly, to circuits for inhibiting the operation of an inverter in the absence of a load.

In many applications, the optimum value of voltage is not available from the primary power source. For example, on camping trips it may be desirable to drive a 60 cycle, 120 volt fluorescent lighting load from a 12 volt DC automobile battery. In such instances a DC-to-AC inverter may be used to provide the desired voltage.

Inverter circuits for transforming DC power to AC power consists basically of some type of switching circuitry to provide an acceptable wave shape to a transformer output. The switching function is usually performed by high speed transistors or silicon controlled rectifiers connected in series with the primary winding of the transformer. The design of the transformer determines the size and frequency of the inverter and provides the transformation ratio necessary to assure that the desired value of output voltage is delivered to the load circuit.

One of the problems with DC-to-AC inverter circuits presently available is that even in the absence of a load connected to the secondary winding of the output transformer the primary winding will continue to draw considerable current unless the inverter is isolated from the DC source.

A load sensing circuit for controlling the operation of an inverter circuit having an output characterized by a transformer secondary winding in accordance with the present invention comprises a thyristor having first and second main electrodes and a gate electrode; means for connecting a load in series circuit with said transformer winding and said main electrodes; means for providing a triggering signal to said gate electrode from said inverter output to render said thyristor conductive; a semiconductor switch; and means for coupling said semiconductor switch to said series circuit and said inverter circuit, the condition of said switch being responsive to the presence of a load in said series circuit to render said inverter circuit operative and responsive in the absence of a load to render said inverter circuit inoperative.

Figure 2:
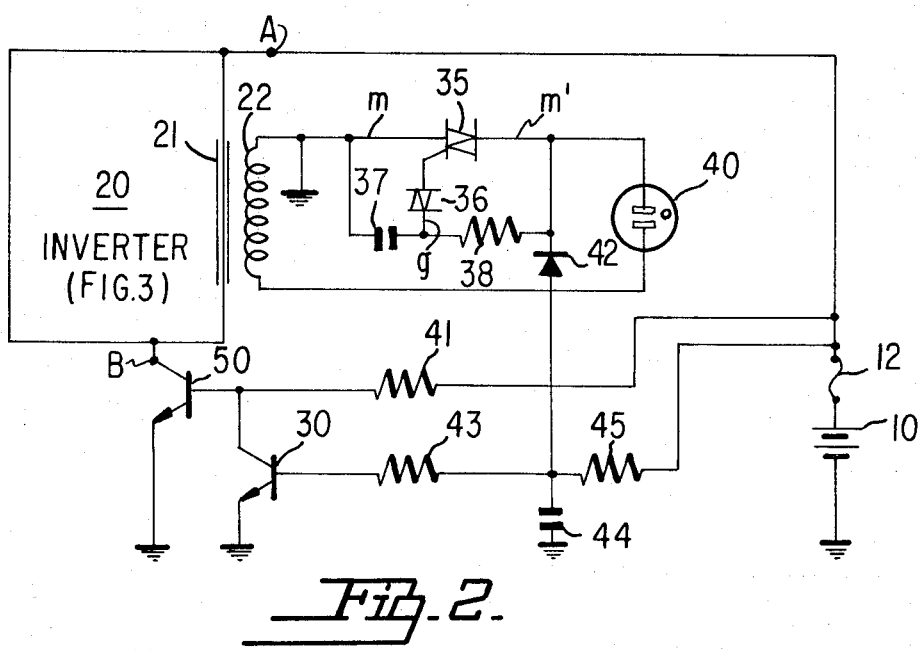
Figure 3:
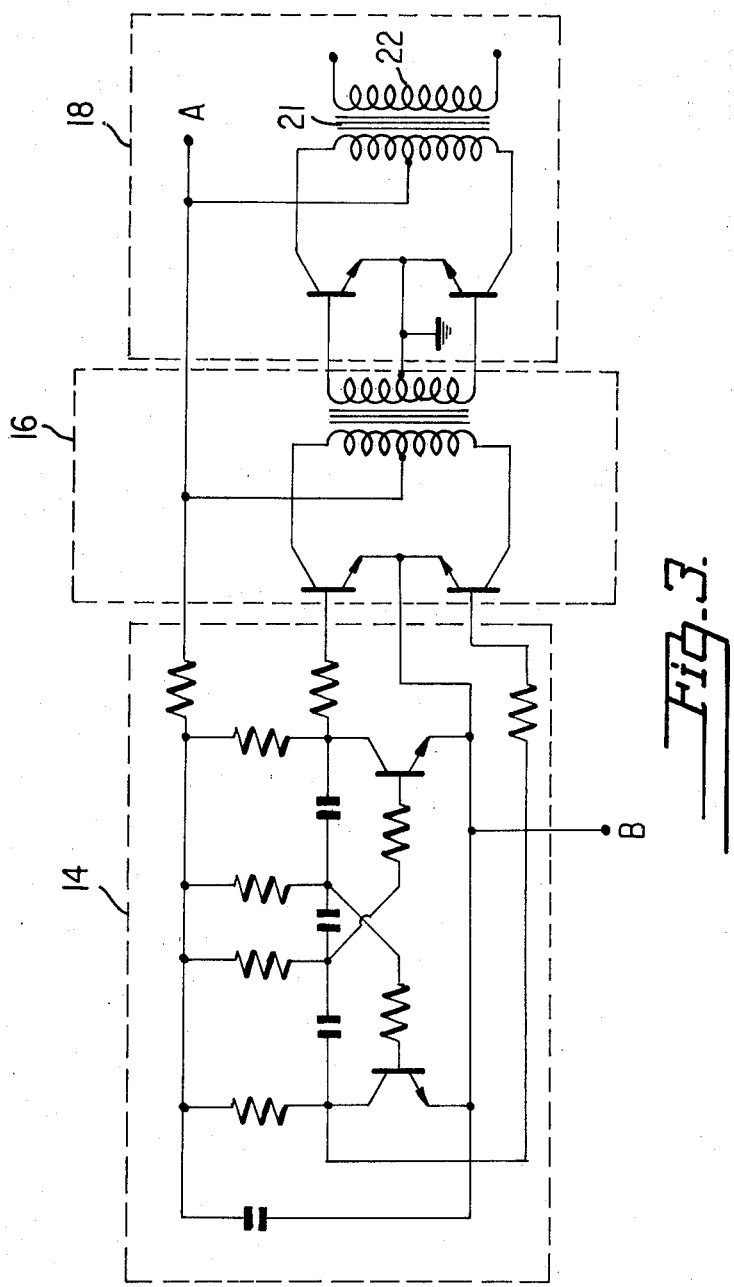

The present invention will be more fully understood upon reading the specification which follows in light of the accompanying drawing, wherein FIGS. 1 and 2 depict load sensing circuits in accordance with embodiments of the present invention and FIG. 3 is illustrative of a DC-to-AC inverter circuit which may be used with the embodiments depicted in FIGS. 1 and 2.

Turning now to a description of the circuit illustrated in FIG. 1 of the drawing, the positive terminal of a DC source 10 is coupled to the input terminal A of a DC-to-AC inverter 20 through a fuse 12; the negative terminal of said DC source 10 being connected to a point of reference potential, such as ground. A second terminal B of the inverter 20 is coupled to ground via the collector-to-emitter path of an NPN transistor 30. In the embodiment shown in FIG. 1 the inverter 20 is of a design such that it will operate only when terminal B is at reference potential, i.e., when transistor 30 is conducting. FIG. 3 is illustrative of such an inverter and will be seen to comprise a free running multivibrator 14 functioning as a clock generator, a driver stage 16 and an output stage 18.

The output of inverter 20 is derived from the secondary winding 22 of the inverter transformer 21 which is connected in series with the main electrodes $m$, $m'$ of a triac 35 and a plug receptacle 40 adapted to receive an AC load (not shown). The triac is of the type having a triggering diac 36 integral with its gate electrode $g$. For example, for applications requiring a repetitive peak, off-state voltage of up to 200 volts RCA's 40431 triac may be used. In the alternative, an external triggering element may be connected to the gate electrode of a conventional three terminal triac. In either case, the triggering element must have a firing voltage greater than the magnitude of the DC source 10. In the case of the RCA 40431 triac the firing voltage of the triggering diac is typically in the order of 35 volts.

A capacitor 37 and a resistor 38, connected in series, are coupled to the main electrodes $m$, $m'$ of triac 35; the gate electrode $g$ of the triac being coupled to the junction formed between capacitor 37 and resistor 38. A diode is connected in series with a second resistor 43, the anode of diode 42 being connected to terminal $m'$ of triac 35; the resistive end of said series combination being connected to the base of the transistor 30. A second capacitor 44 is connected between the cathode of diode 42 and reference potential. A third resistor 45 is connected between the DC source 10 and electrode $m$ of the triac 35.

For purposes of illustration it will be assumed that the inverter 20 is designed to provide a 60 cycle, 120 volt output when the DC source 10 is a 12 volt automobile battery. The triac will be assumed to be an RCA 40431 having a triggering diac integral therewith as discussed supra.

In the absence of a load connected to the plug receptacle 40 the transistor 30 is precluded from conducting for want of biasing potential and the inverter is maintained in an off condition.

When a load is inserted into receptacle 40, capacitor 44 begins charging from source 10 through the path including resistor 45, winding 22, the load itself and forward biased diode 42. The charge on capacitor 44 serves to bias transistor 30 into conduction thereby turning the inverter 20 on. When the inverter 20 turns on the voltage across its output winding 22 climbs toward 120 volts at the same time charging capacitor 37. When the charge across capacitor 37 reaches the firing voltage of the triggering diac, i.e., 35 volts, the triac 35 is triggered into conduction and essentially the full power output from the inverter is supplied to the load. Proper selection of capacitor 37 and resistor 38 insures fast turn on of the triac 35 and corresponding low power loss at the beginning of each half cycle. At the end of each half cycle the triac 35 turns off and then, during the successive half cycle, conducts in the opposite direction. The triac 35 is turned off at the end of each half cycle despite the presence of the DC current which is providing bias to transistor 30 because the DC current is too small to sustain conduction in the triac; i.e., it is below the triac's holding current requirement.

When the load is removed from the circuit, either by pulling the plug from the receptacle 40 or by switching the load off, capacitor 44 discharges through the base-to-emitter path of transistor 30 and thereafter the transistor 30 turns off thereby inhibiting the operation of inverter 30. In the absence of inverter operation, triac 35 is precluded from conducting and essentially no power is drawn from the DC source 10 except for the small leakage current of the switching transistors within the inverter itself.

In the embodiment of the invention depicted in FIG. 1 the output circuitry normally floats at a DC potential determined by source 10. Resistor 45 serves to limit the current drawn from the DC source in the event the output circuitry is shorted to ground.

Turning now to a description of the circuit illustrated in FIG. 2 of the drawing the positive terminal of DC source 10 is coupled to the input terminal A of inverter 20 through fuse 12; the negative terminal of source 10 being connected to ground. Terminal B of inverter 20 is coupled to ground, via the collector-to-emitter path of an NPN transistor 50. The base of transistor 50 is coupled to ground via the collector-to-emitter path of transistor 30 and is further connected through resistor 41 to the positive terminal of source 10 (via fuse 12). The output of inverter 20 is derived from the secondary winding 22 of the inverter transformer 21 which is connected in series with the main electrodes m, m' of triac 35 and plug receptacle 40, as in the case of FIG. 1. The RC Time constant circuit, comprising resistor 38 and capacitor 37, and the triggering diac 36 are also connected in like fashion as in FIG. 1 to the main electrodes m, m' and gate electrode g of triac 35. Unlike FIG. 1, however, the output circuitry of the embodiment depicted in FIG. 2 is referenced to ground instead of floating at source potential.

A second resistor 43 and a third resistor 45 are connected in series between the base of transistor 30 and the positive terminal of source 10 (via fuse 12). The anode of diode 42 is connected to the junction formed between resistors 43 and 45, and the cathode of diode 42 is connected to terminal m' of triac 35. Capacitor 44 is connected between said junction and ground.

In the embodiment shown in FIG. 2 the inverter 20 will operate only when terminal B is clamped to ground, i.e., when transistor 50 is conducting. Accordingly, it will be seen that when transistor 30 is conducting the base of transistor 50 is clamped to ground thereby precluding transistor 50 from conducting and rendering inverter 20 inoperative.

In the absence of a load connected to plug 40 transistor 30 is biased into conduction by the charge across capacitor 44 thereby inhibiting inverter 20 from operation.

When a load is introduced into the circuit of FIG. 2 via plug 40, diode 42 begins to conduct and capacitor 44 discharges through the load and the secondary winding 22 of the transformer 21 causing transistor 30 to turn off and transistor 50 to turn on thereby causing inverter 20 to turn on. The voltage across winding 22 charges capacitor 37 until the charge thereacross is sufficient to break down the triggering diac 36 at which point in time the triac 35 conducts full power.

At the conclusion of the half cycle after the load is removed from the circuit triac 35 turns off and capacitor 44 begins to charge causing transistor 30 to conduct and diode 42 to turn off. When transistor 30 becomes conductive transistor 50 is turned off causing the inverter 20 to be shut down.

Although two embodiments have been illustrated and described modifications thereof are possible within the spirit of this invention. Accordingly, the above description should be taken as illustrative and not in a limiting sense.

What is claimed is:

1. In combination:
    an inverter circuit adapted to be driven from a substantially fixed source of DC potential, the output of said inverter circuit being a transformer secondary winding;
    a thyristor having first and second main electrodes and a gate electrode;
    means for connecting a load in series with said main electrodes and said transformer winding;
    means for providing a triggering signal to said gate electrode to render said thyristor conductive,
    said triggering means being responsive to an applied voltage signal of predetermined magnitude derived from said inverter output in excess of said DC potential;
    a semiconductor switch connected in circuit with said inverter circuit, said switch being responsive to the presence of a load connected to said connecting means to render said inverter circuit operative and being further responsive in the absence of a load to render said inverter circuit inoperative;
    means for biasing said switch into conduction from said DC potential; and
    means for limiting the DC current through said thyristor to a value below its holding current requirement,
    whereby said inverter circuit is prevented from operating in the absence of a load connected to said connecting means.

2. The invention as defined in claim 1 wherein said triggering means comprises an RC circuit coupled to said main electrodes and a triggering element coupled to said gate electrode,
    said RC circuit charging as a function of the voltage across said inverter output,
    said triggering element providing a triggering signal to said thyristor via said gate electrode when said RC circuit charges to said predetermined magnitude.

3. The invention as defined in claim 2 wherein said biasing means comprises a series circuit including said connecting means whereby said semiconductor switch is prevented from conducting in the absence of a load connected to said connecting means.

4. A load sensing circuit for controlling the operation of an inverter circuit having an output characterized by a transformer secondary winding comprising:
    a substantially fixed source of DC potential adapted to drive said inverter circuit;
    a thyristor having first and second main electrodes and a gate electrode;
    means for connecting a load in series circuit with said transformer winding and said main electrodes;
    means for providing a triggering signal to said gate electrode from said output to render said thyristor conductive, said triggering means comprising an RC circuit coupled to said main electrodes and a triggering element coupled to said gate electrode, said triggering element having a firing voltage greater than the magnitude of said DC source, said RC circuit charging as a function of said inverter output, said triggering element becoming conductive to provide a triggering signal to said thyristor via said gate electrode when said RC circuit charges to a value greater than the magnitude of said DC potential;

a semiconductor switch;

means for deriving biasing signal for said semiconductor switch from said source of DC potential;

means for coupling said semiconductor switch to said series circuit and said inverter circuit; and means for limiting the DC current through said thyristor to a value below its holding current requirement, the condition of said switch being responsive to the presence of a load in said series circuit to render said inverter circuit operative, and responsive in the absence of a load to render said inverter circuit inoperative.

* * * * *